July 12, 1938.  R. W. MILLER  2,123,789
ANIMAL TRAP
Filed Nov. 28, 1936  2 Sheets-Sheet 1
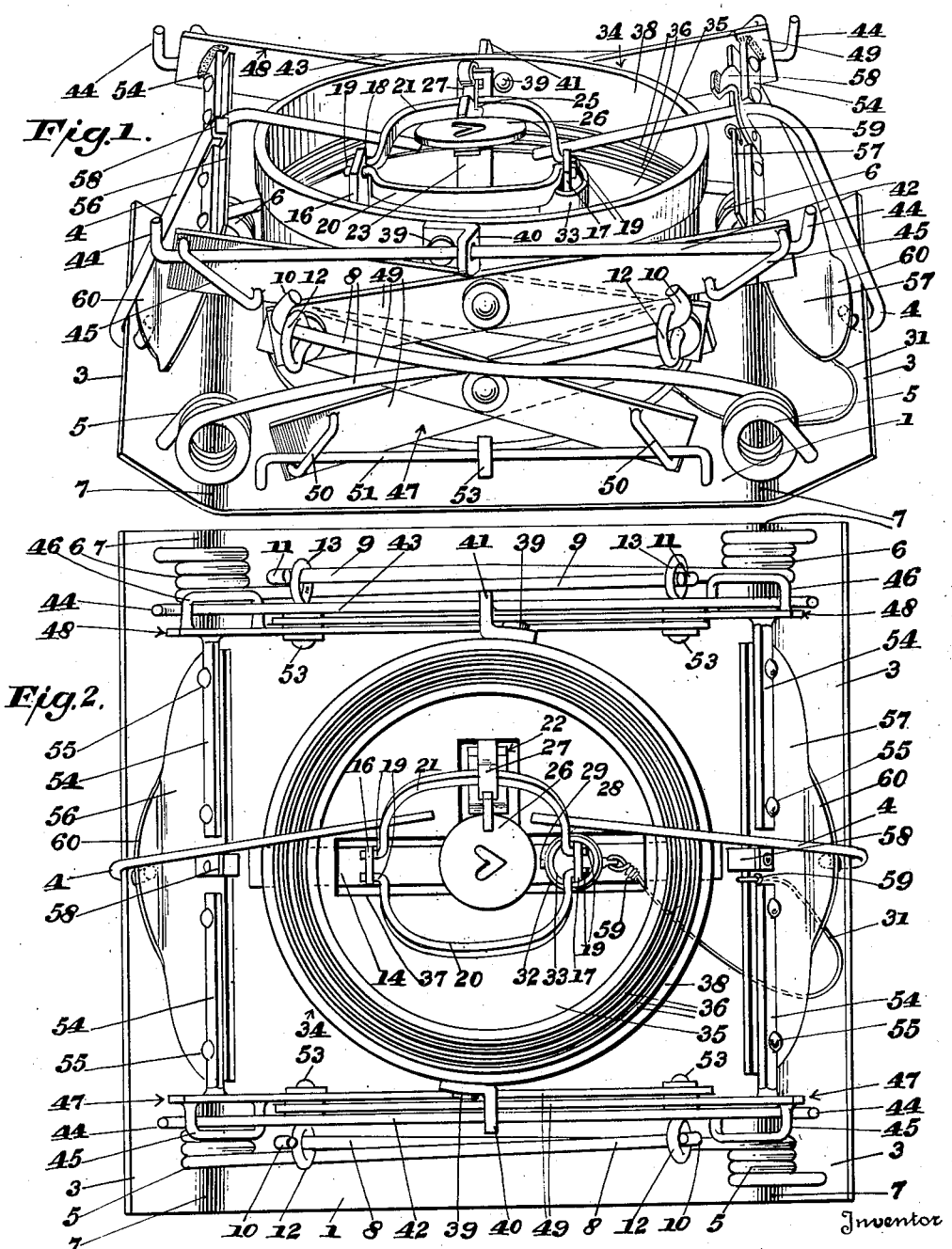
Inventor
Robert W. Miller

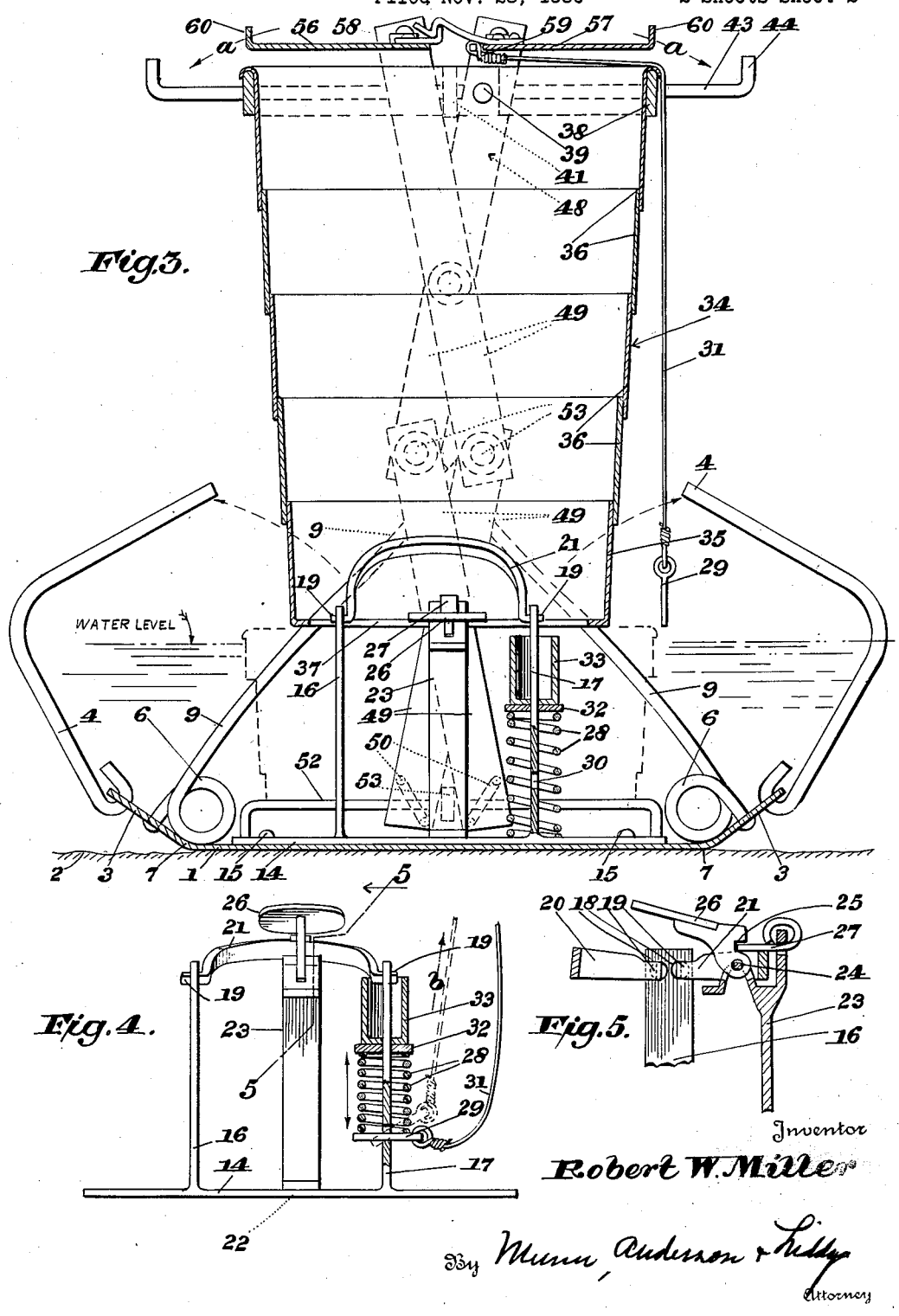

Patented July 12, 1938

2,123,789

UNITED STATES PATENT OFFICE 2,123,789

ANIMAL TRAP

Robert W. Miller, Denver, Colo.

Application November 28, 1936, Serial No. 113,230

3 Claims. (Cl. 43—63)

This invention relates to improvements in animal traps, and its objects are as follows:

First, to provide a trap which will not only capture the animal alive, but also without any but a superficial injury, for which reasons the device comprises a humane trap.

Second, to provide a trap of the foregoing character, which is especially adapted to capturing animals that inhabit the water, at least in part, for example muskrats, which when caught by the trap are elevated above the water so as to prevent their drowning.

Other objects and advantages will appear in the following specification, reference being had to the accompanying drawings, in which:

Figure 1 is a perspective view of the improved animal trap, showing it in the set position.

Figure 2 is a plan view of the trap.

Figure 3 is a central vertical section of the trap, showing it in the sprung position.

Figure 4 is a partially sectional and elevational view of the primary or inner trap.

Figure 5 is a detail cross section taken on the line 5—5 of Fig. 4.

In carrying out the invention, provision is made of a base 1 which is adapted to be set upon the ground 2 (Fig. 3) in water sufficiently shallow that the water level will barely cover the trap in its closed or set position. The base is substantially rectangular in outline (Fig. 2), and its opposite ends are bent upwardly at 3 to form more convenient anchorages for a pair of detents 4 and two sets of springs 5, 6 (Fig. 2).

These springs consist of heavy spring wire, the coils of which rest in the curvature of the base 1 where it turns into the up-bends 3 as indicated at 7. The long, free ends 8, 9 of said springs cross each other, being oppositely directed as shown, and terminate in stops 10, 11 after they pass through eyes 12, 13. A support 14 (Fig. 3) is riveted at 15 (or otherwise secured) to the base 1 so as to be a unitary part of it.

Said support 14 has standards 16, 17, each of which at the top has a pair of holes 18 (Fig. 5) in which the pin-ends 19 of a pair of trap jaws 20, 21 are turnably mounted. These jaws are part of the previously mentioned primary or inner trap, the remaining details of which are as follows:

A branch 22 off to one side of the support 14 (Fig. 4), giving it a rough T-shape in plan, has a third standard 23 mounted on it. The pivot formation 24 at the top of this (Fig. 5) carries the bait pan 26. The heel of this pan has a notch 25 which when engaged by the tip of the detent 27, previously superposed upon the jaw 21, will be held in its set position by the upward tension of a spring 28 (Figs. 3 and 4).

This spring is fitted around the standard 17. It is adapted to rest on a removable pin 29 that is loosely inserted in a hole 30 in the standard 17. The hole is considerably oversize (Fig. 4) so that the pin is readily canted out of its straight-across position when the instant of removal arrives. A flexible wire 31, or its equivalent, is attached at one end to the pin. A pull on the wire removes the pin. The spring 28 is under tension only when rested on the pin 29, and then the upward pressure is applied to a washer 32 and a cup 33, both on the standard 17, the rim of which cup presses upward on both jaws 20, 21. The closing tendency is prevented by the interengagement of the bait pan notch 25 and detent 27 (Fig. 5).

So much for the primary trap. The secondary or main trap is, essentially, a collapsible bucket generally indicated 34 (Fig. 3). It begins with a bottom cup 35, the flaring wall of which is matched by corresponding flares in each of a succession of increasingly larger rings 36. The flares are at such an angle that none of the sections of the bucket will separate from each other when the bucket is expanded to its limit. The bottom cup 35 has a sufficiently large and properly shaped opening 37 (Fig. 2) to accommodate the standards 16, 17 and 23. The jaws 20 and 21 and the bait pan 26 are always above the bottom of the cup 35.

The uppermost ring 36 goes through a hoop 38 to which it is attached by the same rivets 39 that secure a pair of oppositely located lugs 40, 41 in place. These lugs have holes in which lift bars 42, 43 are fitted. The opposite ends of said bars are bent at 44, or may be provided with some other type of stops. These bars loosely occupy the elongated eyes 45, 46 of corresponding pairs of lazy tongs 47, 48 on opposite sides of the trap.

Said lazy tongs comprise a suitable and desired number of sections 49 pivoted together in crossed relationship, there being elongated eyes 50 at the bottom, similar to the eyes 45, 46, to contain fixedly mounted guide bars 51, 52. These bars are secured to the base 1, and they have central stops 53 to prevent the elevated trap from tilting toward either bent up end 3.

In the present instance, two sets of crossed sections 49 are used (Fig. 3), and it is the shanks 53 of the eyes 12, 13 that connect them medially. Since the upward pressure of the springs 5, 6 (through their ends 8, 9) is exerted on the eyes 12, 13 it follows that the trap bucket will be elevated with a well balanced effort.

The pairs of lazy tongs 47, 48 are made to move in unison, and are stabilized, by brackets 54 or their equivalents, which are welded or otherwise affixed to the top lazy tong sections, and riveted at 55 to cover sections 56, 57. These cover sections are in rigid relationship to the top lazy tong sections, and as the lazy tongs extend from the position in Fig. 1 to that in Fig. 3, the cover sections turn until they close the top of the bucket 34 in the now extended position.

They are temporarily held thus by the interengaging elements of a latch 58. The previously mentioned wire 31 has its upper end tied to the leading edge of the nearest cover 57 as at 59. These covers are hooked at 60 to provide fingerholds by means of which the covers are separated in setting the main trap.

The operation is readily understood. It will be assumed that the trap has been sprung, as in Fig. 3, from which position the setting will start. This is begun by hooking the fingers of the two hands in the fingerholds 60 and moving the covers 56, 57 outwards in the directions of the arrows *a* (Fig. 3), the latch 58 being released first. At first the covers will be moved only far enough to enable the operator to bring the pin 29 within range of the hole 30.

At this particular time the spring 28 will be loose and expanded (Fig. 3), and since there is plenty of room on the standard 17 it is an easy matter to work the spring up high enough to enable inserting the pin. The covers 56, 57 are then separated all the way until they reach the positions in Figs. 1 and 2 where they will be held by the detents 4 which are now brought over into position.

As the covers are separated as stated, the eyes 45, 46 bear down on the lift bars 42, 43. This moves the hoop 38 downward, so that the bucket sections 36 collapse, and close the lazy tongs. The collapsed bucket approaches the spring 28 until the pin 29 becomes established in position inside of the bucket. The now loose wire 31 simply drapes under the bottom cup 35.

With the detents 4 in proper location (Fig. 2), the jaws 20, 21 are spread. The jaw 21, especially, puts the spring 28 under tension by bearing down on the cup 33, which tension is held by interfitting the bait pan notch 25 and the detent 27 (Fig. 5). The entire trap is now set. It is submerged substantially as indicated in Fig. 3.

The jaw 21 is released when the animal steps upon the bait pan 26. The pressure of the spring 28 (Fig. 4) closes the jaws 20, 21 so that the animal is caught by a leg. This is the first act of the trap. The upward movement of the jaw 21 releases both detents 4. The springs 5, 6 now act to elevate the bucket 34 so that the animal is enclosed thereby. The covers 56, 57 move into position so that the animal cannot get out when released within the bucket.

This takes place when the bucket nears the limit of its extension. The closing cover 57 pulls on the wire 31 (arrow *b*, Fig. 4) so that it removes the pin 29 (dotted lines) from beneath the spring 28. The latter expands (Fig. 3), releasing the pressure from the jaws 20, 21. The animal can now readily extricate its leg, which will not have been seriously injured, if at all.

I claim:

1. An animal trap comprising a spring-actuated primary trap having detent means and jaws, and a coil spring having its axis in a vertical plane, a collapsible and extensible main trap having springs for its extension, detent means held down by one of the jaws when the primary trap is set, to hold the main trap collapsed against the tension of its springs, the release of the primary trap detent means and the snapping closed of its jaws releasing the detent means of the main trap so that it will extend to an animal-enclosing position, a support under the spring of the primary trap holding said spring under tension, and means actuated by the main trap when extended to slidably remove the support and let the primary trap spring expand.

2. An animal trap comprising a primary trap having jaws, standards on which the jaws are pivoted, one of the standards having a hole, a spring on the same standard and means through which the spring may exert closing pressure on the jaws, a pin inserted in the hole on which pin the spring is rested to place it under tension, detent means to hold the jaws open against the tension of the spring, the release of the detent means releasing the spring to snap the jaws closed, and means to withdraw the pin from the hole, letting the spring expand on the respective standard so that the jaws become loose.

3. An animal trap comprising an extensible and collapsible bucket consisting of interfitted flared rings and a bottom cup, pairs of lazy tongs loosely connected with the bucket, springs acting on the lazy tongs to extend the bucket, and detent means to hold the bucket collapsed, the release of the detent means enabling the springs to extend the lazy tongs and the rings into full bucket form.

ROBERT W. MILLER.